United States Patent
Cedarleaf-Pavy et al.

(10) Patent No.: US 11,990,652 B2
(45) Date of Patent: May 21, 2024

(54) FUEL CELL SYSTEM HEAT EXCHANGER INCLUDING WELDED HEAT EXCHANGE PLATE AND METHOD OF FORMING SAME

(71) Applicant: BLOOM ENERGY CORPORATION, San Jose, CA (US)

(72) Inventors: Jordan Cedarleaf-Pavy, Sunnyvale, CA (US); Nicholas Arcelona, Milpitas, CA (US); Matthew Mahoney, Newark, DE (US); Adrian Basharain, San Jose, CA (US); Joshua Baime, Mountain View, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 174 days.

(21) Appl. No.: 17/231,575

(22) Filed: Apr. 15, 2021

(65) Prior Publication Data
US 2021/0328238 A1 Oct. 21, 2021

Related U.S. Application Data

(60) Provisional application No. 63/011,339, filed on Apr. 17, 2020.

(51) Int. Cl.
*H01M 8/04007* (2016.01)
*F28F 3/02* (2006.01)

(52) U.S. Cl.
CPC ......... *H01M 8/04074* (2013.01); *F28F 3/025* (2013.01)

(58) Field of Classification Search
CPC ..... H01M 8/04074; H01M 2008/1293; H01M 8/12; F28F 3/025; Y02E 60/50; F28D 1/0358; F28D 2021/0043
See application file for complete search history.

(56) References Cited

U.S. PATENT DOCUMENTS

| | | | | |
|---|---|---|---|---|
| 1,516,694 A | * | 11/1924 | Atkinson | B65D 7/12 220/671 |
| 2,636,968 A | * | 4/1953 | Watter | B62D 27/023 219/83 |
| 6,032,730 A | * | 3/2000 | Akita | F28D 9/0037 165/157 |
| 8,563,180 B2 | | 10/2013 | Perry et al. | |
| 8,877,399 B2 | | 11/2014 | Weingaertner et al. | |
| 8,968,943 B2 | | 3/2015 | Perry et al. | |
| 9,190,673 B2 | | 11/2015 | Venkataraman et al. | |
| 9,287,572 B2 | | 3/2016 | Weingaertner et al. | |
| 9,520,602 B2 | | 12/2016 | Venkataraman et al. | |
| 9,780,392 B2 | | 10/2017 | Perry et al. | |
| 9,941,525 B2 | | 4/2018 | Perry et al. | |
| 9,991,526 B2 | | 6/2018 | Perry et al. | |
| 10,797,327 B2 | | 10/2020 | Perry et al. | |
| 2012/0178003 A1 | * | 7/2012 | Venkataraman | H01M 8/04007 429/408 |
| 2012/0196194 A1 | | 8/2012 | Perry et al. | |
| 2012/0196195 A1 | | 8/2012 | Perry et al. | |
| 2014/0178786 A1 | | 6/2014 | Perry et al. | |
| 2015/0111121 A1 | | 4/2015 | Weingaertner et al. | |
| 2015/0140457 A1 | | 5/2015 | Perry et al. | |
| 2016/0064748 A1 | | 3/2016 | Venkataraman et al. | |
| 2016/0233529 A1 | | 8/2016 | Perry et al. | |
| 2017/0356490 A1 | * | 12/2017 | Santiago | F16C 17/042 |
| 2018/0191007 A1 | | 7/2018 | Perry et al. | |
| 2021/0020967 A1 | | 1/2021 | Edmonston et al. | |

OTHER PUBLICATIONS

Baileigh, "Power Bead Roller Machine Br-18e-36," https://www.baileigh.com/bead-roller-br-18e-36 (visited Apr. 15, 2021).
KenFrederick, "Sheet Metal Roller Bead" *PTC Community*, Feb. 14, 2015, https://community.ptc.com/t5/Part-Modeling/Sheet-Metal-Roller-Bead/td-p/174434.
*Pro-Tools* Edge Bead Roll Set (½″ Bead), https://pro-tools.com/products/product-aspx-zpid-2174 (visited Apr. 15, 2021).

* cited by examiner

*Primary Examiner* — Muhammad S Siddiquee

(74) *Attorney, Agent, or Firm* — THE MARBURY LAW GROUP PLLC

(57) ABSTRACT

A method of forming a fuel cell system heat exchanger includes flattening opposing ends of a corrugated heat exchange plate to form opposing flattened ends, and welding the flattened ends to structural components of the fuel cell system. The flattening may include using a hydraulic press or a bead roller.

10 Claims, 9 Drawing Sheets

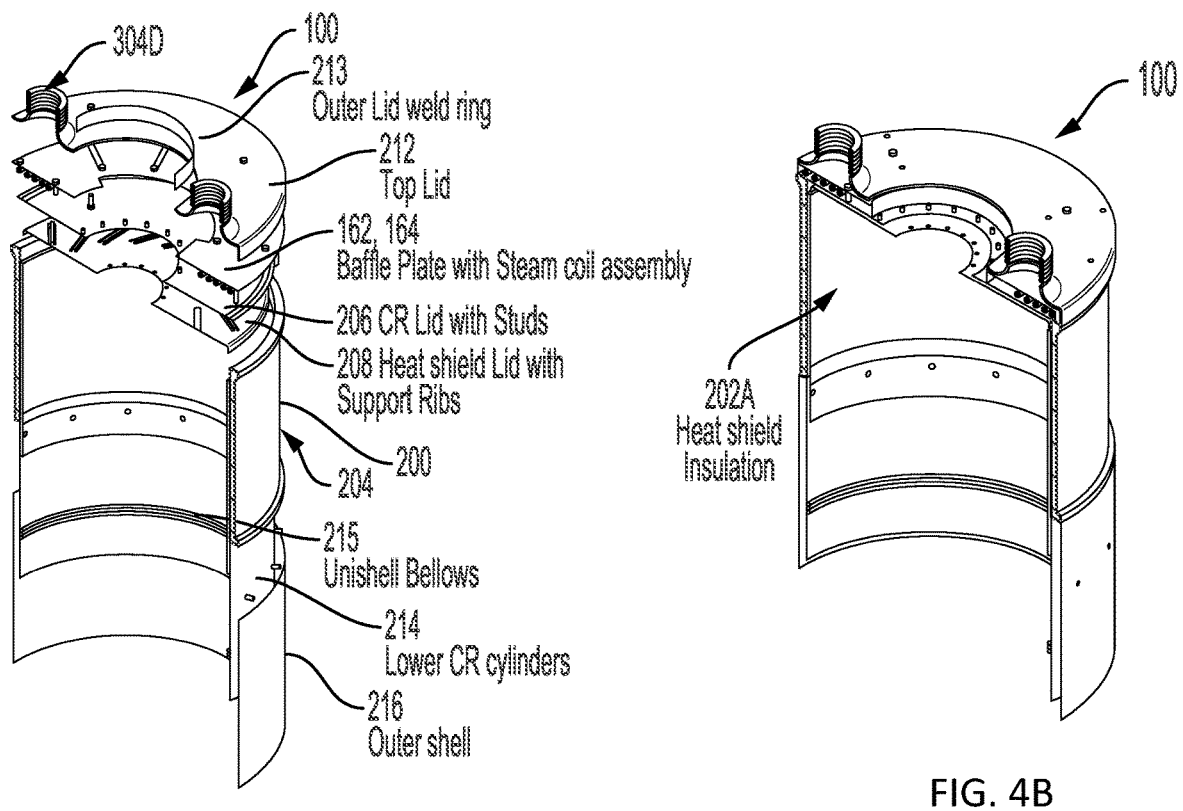
FIG. 4A
FIG. 4B
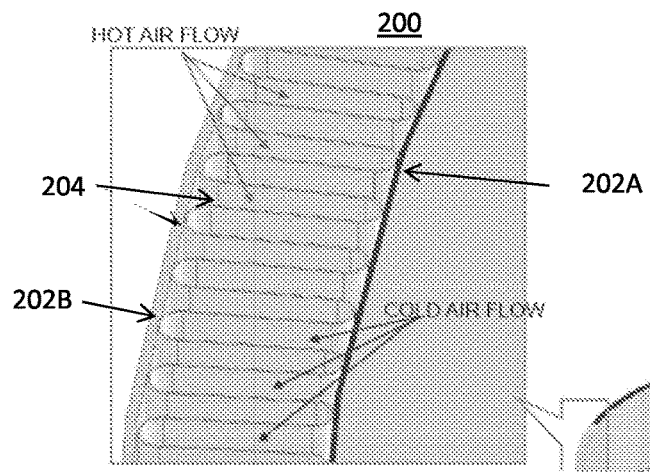
FIG. 4D
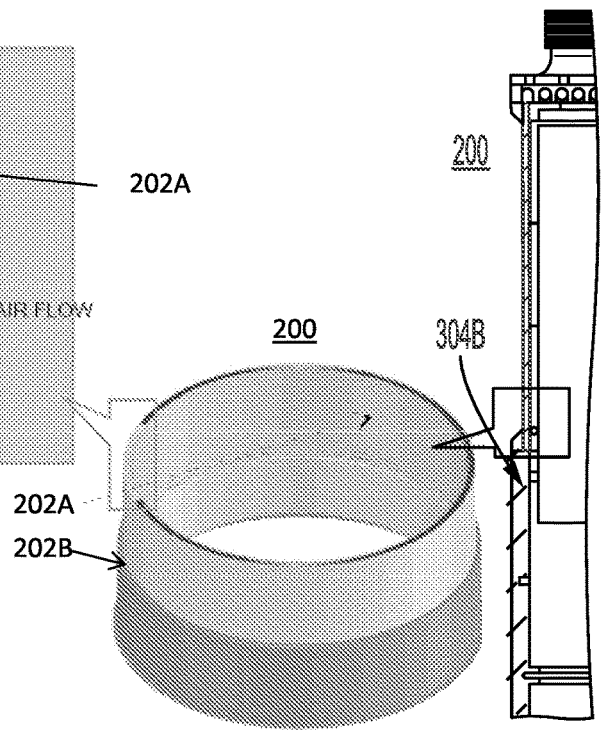
FIG. 4C
FIG. 4E

US 11,990,652 B2

FUEL CELL SYSTEM HEAT EXCHANGER INCLUDING WELDED HEAT EXCHANGE PLATE AND METHOD OF FORMING SAME

FIELD

Aspects of the present disclosure relate to heat exchangers for a fuel cell system, such as heat exchangers containing a welded heat exchange plate, and methods of making the same.

BACKGROUND

Fuel cells, such as solid oxide fuel cells, are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

SUMMARY

According to one embodiment of the present disclosure a method of forming a fuel cell system heat exchanger includes flattening opposing ends of a corrugated heat exchange plate to form opposing flattened ends and welding the flattened ends to structural components of the fuel cell system.

According to another embodiment, a heat exchanger comprises a corrugated, cylindrical heat exchange plate having opposing first and second flattened ends separated by a middle portion containing unflattened corrugations containing gas flow channels, a top cap welded to the first flattened end, and a bottom cap welded to the second flattened end.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

FIGS. 4A-4H are sectional views of the hotbox and a cathode recuperator of the system of FIG. 1, according to various embodiments of the present disclosure.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Figure 1:
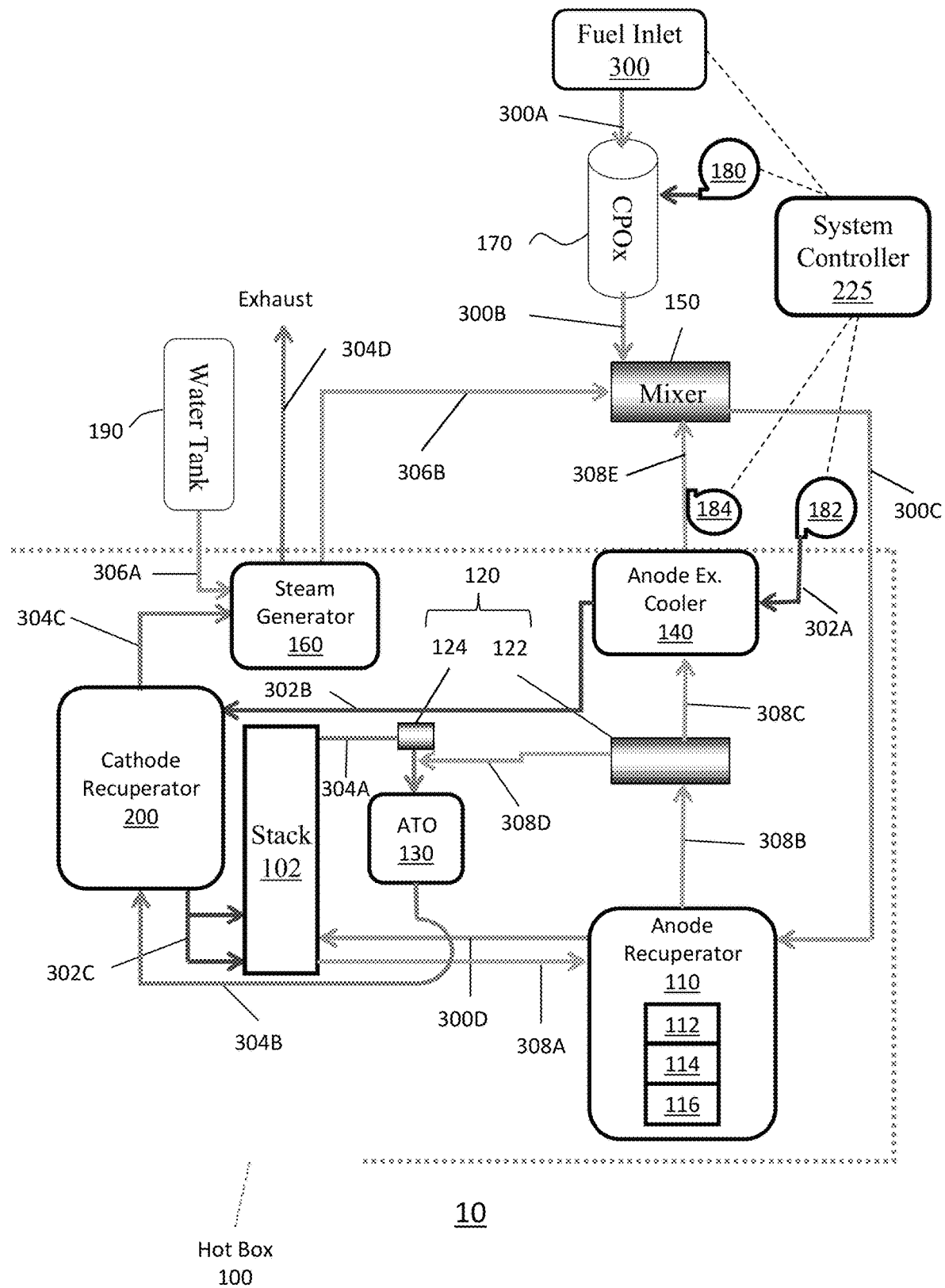
FIG. 1 is a schematic of a SOFC fuel cell system, according to various embodiments of the present disclosure.

FIG. 1 is a schematic representation of a solid oxide fuel cell (SOFC) system 10, according to various embodiments of the present disclosure. Referring to FIG. 1, the system 10 includes a hotbox 100 and various components disposed therein or adjacent thereto.

The hot box 100 may contain fuel cell stacks 102, such as a solid oxide fuel cell stacks (where one solid oxide fuel cell of the stack contains a ceramic electrolyte, such as yttria stabilized zirconia (YSZ) or scandia stabilized zirconia (SSZ), an anode electrode, such as a nickel-YSZ or Ni-SSZ cermet, and a cathode electrode, such as lanthanum strontium manganite (LSM)). The stacks 102 may be arranged over each other in a plurality of columns.

The hot box 100 may also contain an anode recuperator 110, a cathode recuperator 200, an anode tail gas oxidizer (ATO) 130, an anode exhaust cooler 140, an ATO mixer/injector (which is referred herein as an ATO injector for brevity) 120 including a splitter 122 and a vortex generator 124, and a steam generator 160. The system 10 may also include a catalytic partial oxidation (CPOx) reactor 170, a mixer 150, a CPOx blower 180 (e.g., air blower), a system blower 182 (e.g., air blower), and an anode recycle blower 184, which may be disposed outside of the hotbox 100. However, the present disclosure is not limited to any particular location for each of the components with respect to the hotbox 100.

The CPOx reactor 170 receives a fuel inlet stream from a fuel inlet 300, through fuel conduit 300A. The fuel inlet 300 may be a utility gas line including a valve to control an amount of fuel provided to the CPOx reactor 170. The CPOx blower 180 may provide air to the CPOx reactor 170 during system 10 start-up, and then turned off during steady-state operating mode when the fuel cell stacks 102 reach a steady-state operating temperature above 700° C., such as 750 to 900° C. The fuel in the steady state and/or a mixture of fuel and air during start-up may be provided to the mixer 150 by fuel conduit 300B. Fuel flows from the mixer 150 to the anode recuperator 110 through fuel conduit 300C. Fuel flows from the anode recuperator 110 to the stack 102 through fuel conduit 300D. The system 10 may also include one or more fuel reforming catalysts 112, 114, and 116 in the anode recuperator 110.

The main air blower 182 may be configured to provide an air stream (e.g., air inlet stream) to the anode exhaust cooler 140 through air conduit 302A. Air flows from the anode exhaust cooler 140 to the cathode recuperator 200 through air output conduit 302B. The air flows from the cathode recuperator 200 to the stack 102 through air conduit 302C.

Anode exhaust (i.e., fuel exhaust) generated in the stack 102 is provided to the anode recuperator 110 through anode exhaust outlet conduit(s) 308A. The anode exhaust may contain unreacted fuel. The anode exhaust may also be referred to herein as fuel exhaust. The anode exhaust may be provided from the anode recuperator 110 to the splitter 122 by the anode exhaust conduit 308B. A first portion of the anode exhaust may be provided from the splitter 122 to the ATO 130 via an anode exhaust output conduit 308D. A second portion of the anode exhaust may be provided from the splitter 122 to the anode exhaust cooler 140 by a first anode exhaust recycling conduit 308C. Anode exhaust may be provided from the anode exhaust cooler 140 to mixer 150 by a second anode exhaust recycling conduit 308E. The anode recycle blower 184 may be configured to move anode exhaust though the second anode exhaust recycling conduit 308E, as discussed below.

Cathode exhaust (e.g., air exhaust) generated in the stack 102 flows to the ATO 130 through cathode exhaust conduit 304A. The cathode exhaust may also be referred to herein as air exhaust. The vortex generator 124 may be disposed in the cathode exhaust conduit 304A and may be configured to swirl the cathode exhaust. Conduit 308D may be fluidly connected to the cathode exhaust conduit 304A, downstream of the vortex generator 124. The swirled cathode exhaust exiting the vortex generator 124 may mix with the anode exhaust provided by the splitter 122 before being provided to the ATO 130. The mixture may be oxidized in the ATO 130 to generate ATO exhaust. The ATO exhaust flows from the ATO 130 to the cathode recuperator 200 through exhaust conduit 304B. Exhaust flows from the cathode recuperator 200 to the steam generator 160 through exhaust conduit 304C. Exhaust flows from the steam generator 160 and out of the hotbox 100 through exhaust conduit 304D.

Water flows from a water source 190, such as a water tank or a water pipe, to the steam generator 160 through water conduit 306A. The steam generator 160 converts the water into steam using heat from the ATO exhaust provided by exhaust conduit 304C. Steam is provided from the steam generator 160 to the mixer 150 through water conduit 306B. Alternatively, if desired, the steam may be provided directly into the fuel inlet stream and/or the anode exhaust stream may be provided directly into the fuel inlet stream followed by humidification of the combined fuel streams. The mixer 150 is configured to mix the steam with anode exhaust and fuel. This fuel mixture may then be heated in the anode recuperator 110, before being provided to the stack 102.

The system 10 may further a system controller 225 configured to control various elements (e.g., blowers 182 and 184 and the fuel control valve) of the system 10. The controller 225 may include a central processing unit configured to execute stored instructions. For example, the controller 225 may be configured to control fuel and/or air flow through the system 10, according to fuel composition data.

Figures 2A, 2B:
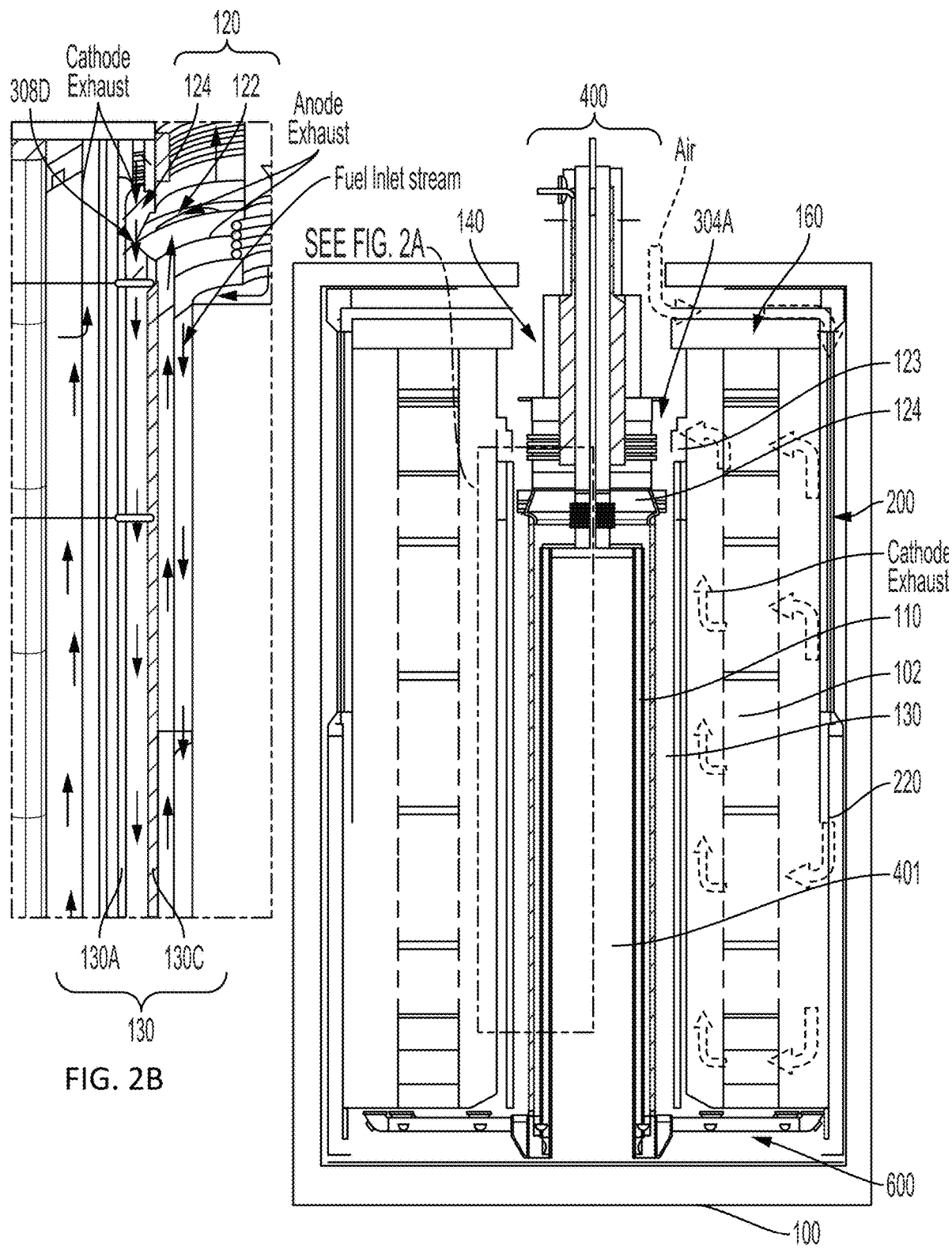
FIG. 2A is a sectional view showing components of the hot box of the system of FIG. 1.
FIG. 2B shows an enlarged portion of FIG. 2A.
Figure 2C:
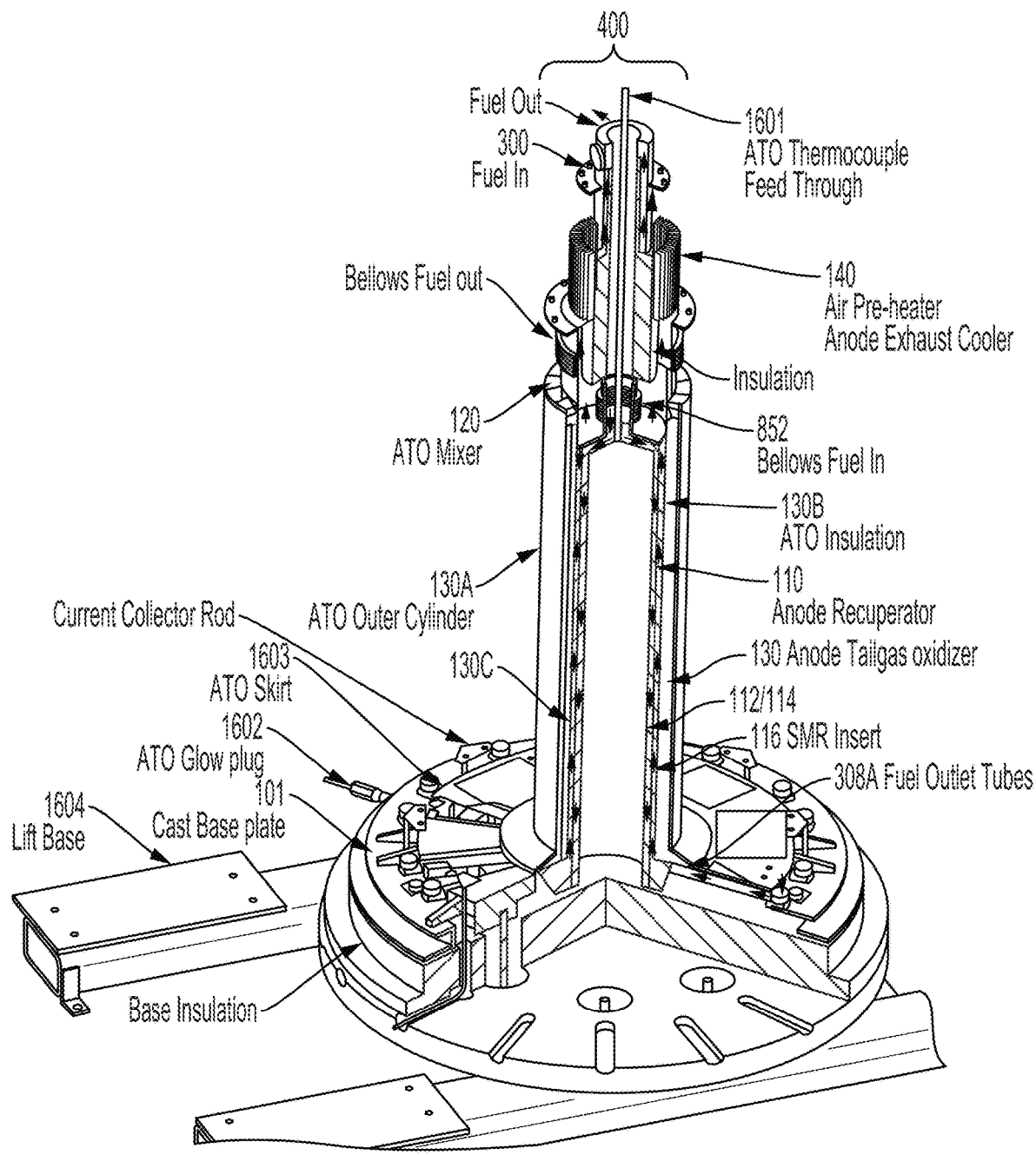
FIG. 2C is a three dimensional cut-away view of a central column of the system of FIG. 2A.
Figure 2D:
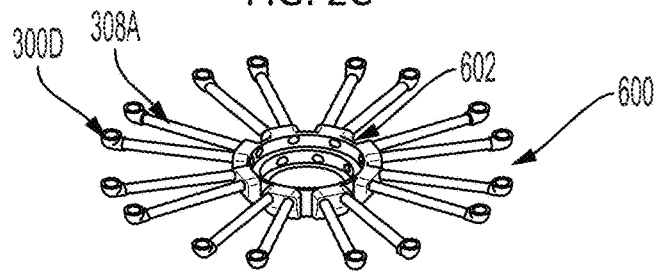
FIG. 2D is a perspective view of an anode hub structure disposed below the central column of FIG. 2A, according to various embodiments of the present disclosure.

FIG. 2A is a sectional view showing components of the hot box 100 of the system 10 of FIG. 1, and FIG. 2B shows an enlarged portion of FIG. 2A. FIG. 2C is a three dimensional cut-away view of a central column 400 of the system 10, according to various embodiments of the present disclosure, and FIG. 2D is a perspective view of an anode hub structure 600 disposed in a hot box base 101 on which the column 400 may be disposed.

Referring to FIGS. 2A-2D, the fuel cell stacks 102 may be disposed in the hot box 100 around the column 400. For example, the stacks 102 may be disposed in a ring configuration around the central column 400 and may be positioned on the hot box base 101. The column 400 may include a central plenum 401, the anode recuperator 110, the ATO 130, and the anode exhaust cooler 140. In particular, the anode recuperator 110 is disposed radially inward of the ATO 130, and the anode exhaust cooler 140 is mounted over the anode recuperator 110 and the ATO 130. An oxidation catalyst 112 and/or the hydrogenation catalyst 114 may be located in the anode recuperator 110. A reforming catalyst 116 may also be located at the bottom of the anode recuperator 110 as a steam methane reformation (SMR) insert.

The ATO 130 comprises an outer cylinder 130A that is positioned around inner ATO insulation 130B/outer wall of the anode recuperator 110. Optionally, the insulation 130B may be enclosed by an inner ATO cylinder 130C. Thus, the insulation 130B may be located between the anode recuperator 110 and the ATO 130. An ATO oxidation catalyst may be located in the space between the outer cylinder 130A and the ATO insulation 130B. An ATO thermocouple feed through 1601 extends through the anode exhaust cooler 140, to the top of the ATO 130. The temperature of the ATO 130 may thereby be monitored by inserting one or more thermocouples (not shown) through this feed through 1601.

The anode hub structure 600 may be positioned under the anode recuperator 110 and ATO 130 and over the hot box base 101. The anode hub structure 600 is covered by an ATO skirt 1603. The ATO injector 120 including the vortex generator 124 and anode exhaust splitter 122 is located over the anode recuperator 110 and ATO 130 and below the anode cooler 140. An ATO glow plug 1602, which initiates the oxidation of the stack anode exhaust in the ATO during startup, may be located near the bottom of the ATO 130.

The anode hub structure 600 is used to distribute fuel evenly from a central plenum to fuel cell stacks disposed around the central column 400. The anode flow hub structure 600 includes a grooved cast base 602 and a "spider" hub of fuel inlet conduits 300D and outlet conduits 308A. Each pair of conduits 300D, 308A connects to a fuel cell stack. Anode side cylinders (e.g., anode recuperator 110 inner and outer cylinders and ATO outer cylinder 130A) are then welded or brazed into the grooves in the base 602, creating a uniform volume cross section for flow distribution as discussed below.

As illustrated in FIG. 2C, a lift base 1604 located under the hot box base 101. In an embodiment, the lift base 1604 includes two hollow arms with which the forks of a fork lift can be inserted to lift and move the fuel cell unit, such as to remove the fuel cell unit from a cabinet (not shown) for repair or servicing.

As shown by the arrows in FIGS. 2A and 2B, air enters the top of the hot box 100 and then flows into the cathode recuperator 200 where it is heated by cathode exhaust from the stacks 102. The heated air then flows inside the cathode recuperator 200 and then exits through an outlet 220 toward the stacks 102. The air then flows through the stacks 102 and reacts with fuel provided from the anode hub structure 600. Cathode exhaust flows from the stacks 102, through an outlet 123. The air exhaust then passes through the vanes of the vortex generator 124 and is swirled before entering the ATO 130.

The splitter 122 may direct a portion of the anode exhaust exiting the top of the anode recuperator 110 into the swirled air exhaust. The anode exhaust and the cathode exhaust may be mixed in the ATO injector 120 before entering the ATO 130.

Figure 3A:
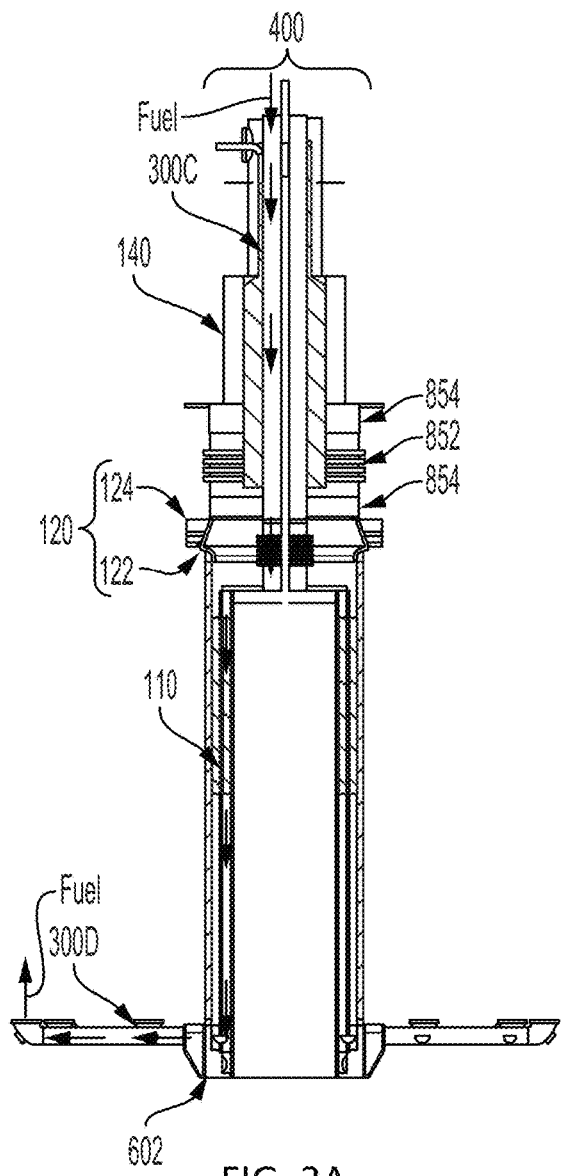
FIGS. 3A-3C are sectional views showing fuel and air flow through the central column of FIG. 2A, according to various embodiments of the present disclosure.
Figure 3B:
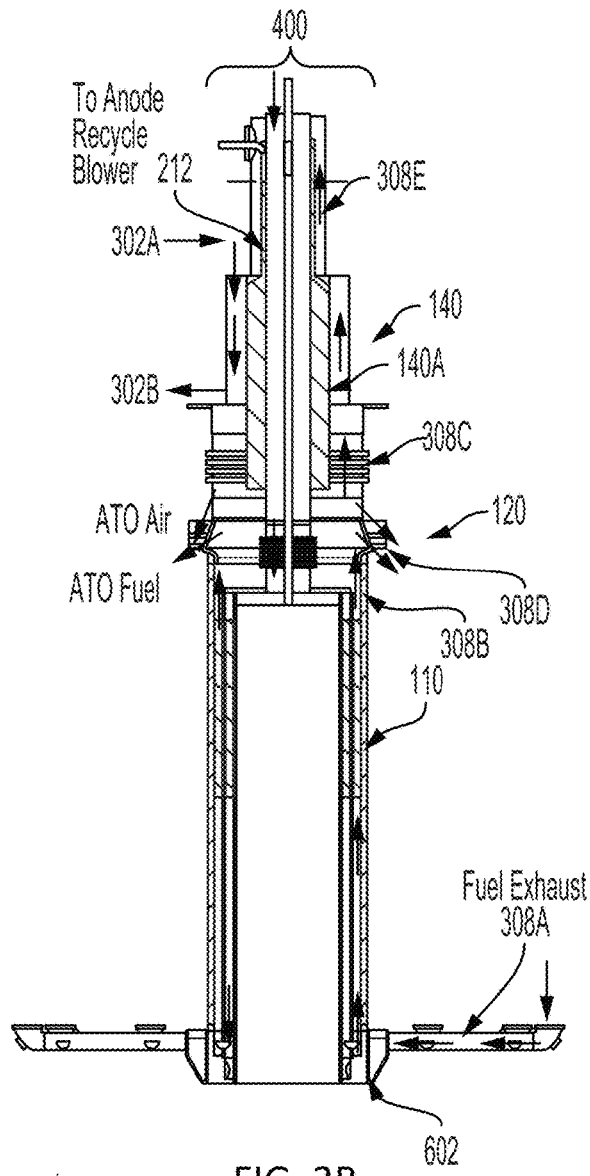

FIGS. 3A and 3B are side cross-sectional views showing flow distribution through the central column 400, and 3C is top cross-sectional view taken through the anode recuperator 110. Referring to FIGS. 2A, 2B, 3A, and 3C, the anode recuperator 110 includes an inner cylinder 110A, a corrugated plate 110B, and an outer cylinder 110C that may be coated with the ATO insulation 130B. Fuel from fuel conduit 300C enters the top of the central column 400. The fuel then bypasses the anode cooler 140 by flowing through its hollow core and then flows through the anode recuperator 110, between the outer cylinder 110C and the and the corrugated plate 110B. The fuel then flows through the hub base 602 and conduits 300D of the anode hub structure 600 (FIG. 3B), to the stacks 102.

Figure 3C:
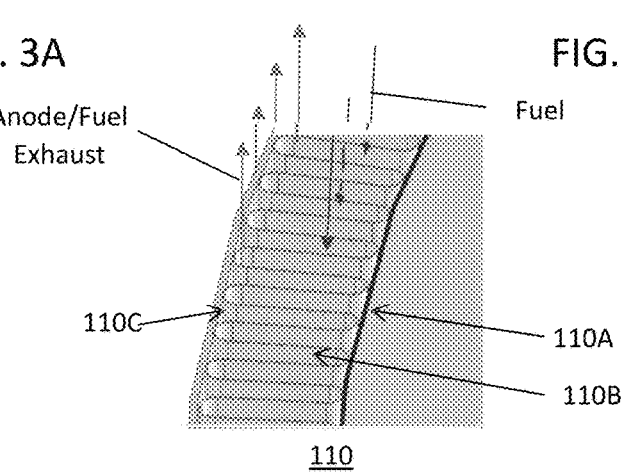

Referring to FIGS. 2A, 2B, 3A, and 3B, anode exhaust flows from the stacks 102 through conduits 308A into the hub base 602, and from the hub base 602 through the anode recuperator 110, between in inner cylinder 110A and the corrugated plate 110B, and through conduit 308B into the splitter 122. A portion of the anode exhaust flows from the splitter 122 to the anode cooler 140 through conduit 308C, while another portion flows from the splitter 122 to the ATO 130 through conduit 308D (see FIG. 1). Conduit 308C may be at least partially defined by a bellows 852 and a supporting cylinder 854 located between the anode cooler 140 and the vortex generator 124, as shown in FIGS. 3A and 3C. Anode cooler inner core insulation 140A may be located between the fuel conduit 300C and conduit 308C. This insulation minimizes heat transfer and loss from the anode exhaust stream in conduit 308C on the way to the anode cooler 140. Insulation 140A may also be located between conduit 300C and the anode cooler 140 to avoid heat transfer between the fuel inlet stream in conduit 300C and the streams in the anode cooler 140. The bellows 852 and supporting cylinder 854 may be disposed between the anode cooler 140 and the splitter 122.

FIG. 3B also shows air flowing from the air conduit 302A to the anode cooler 140 (where it exchanges heat with the anode exhaust stream), into conduit 302B to the cathode recuperator 200. As shown in FIGS. 2A and 3B, the anode exhaust exits the anode recuperator 110 and is provided into splitter 122 through conduit 308B. The splitter 122 splits the anode exhaust into first and second anode exhaust streams. The first stream is provided to the ATO 130 through conduit 308D. The second stream is provided into the anode cooler 140 through conduit 308C.

The relative amounts of anode exhaust provided to the ATO 130 and the anode exhaust cooler 140 is controlled by the anode recycle blower 184. The higher the blower 184 speed, the larger portion of the anode exhaust stream is provided into conduit 308C and a smaller portion of the anode exhaust stream is provided to the ATO 130, and vice-versa. The anode exhaust stream provided to the ATO 130 may be oxidized by the cathode exhaust and provided to the cathode recuperator 200 through conduit 304B.

Cathode Recuperator

Figures 4F, 4G:
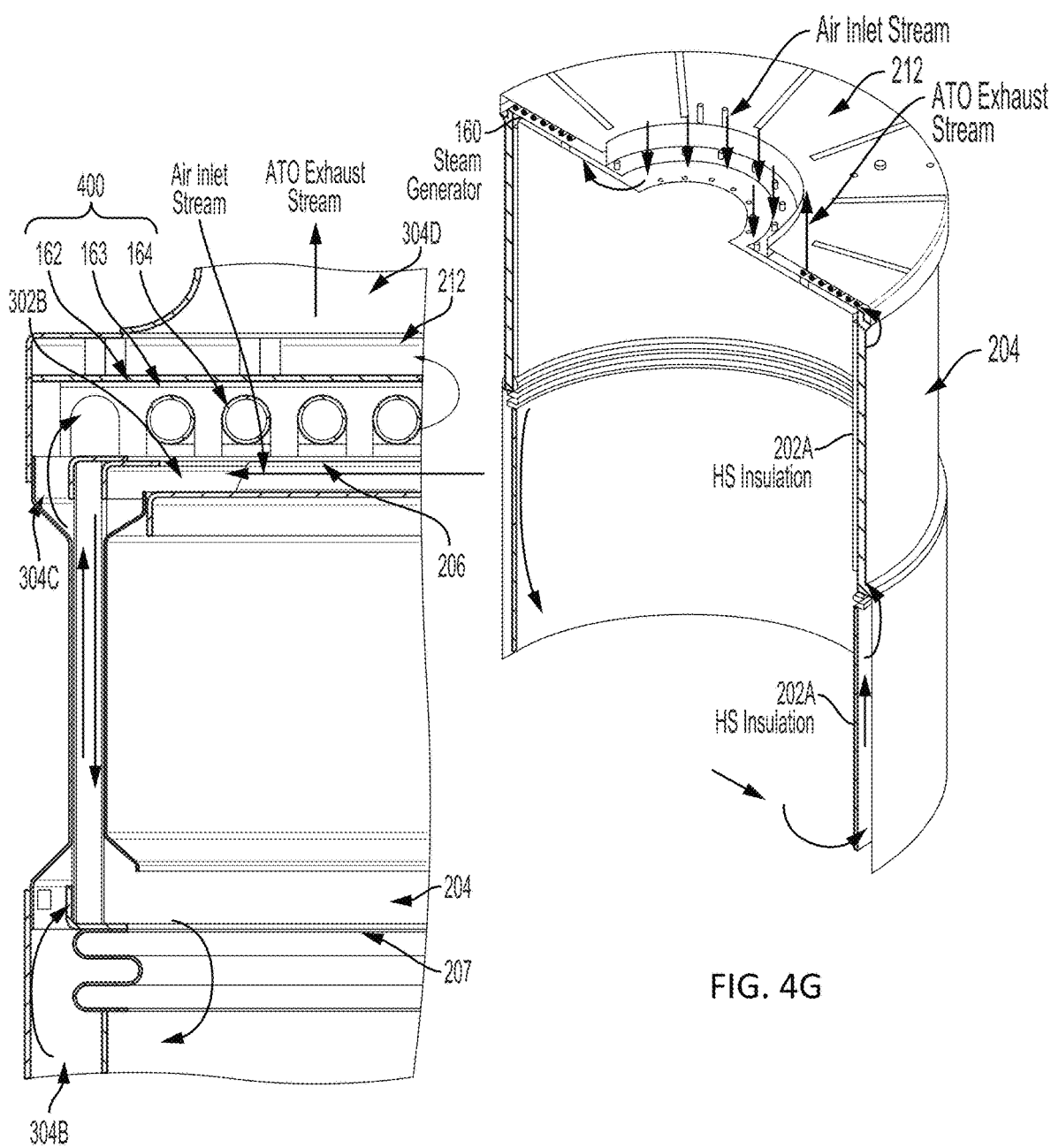
Figure 4H:
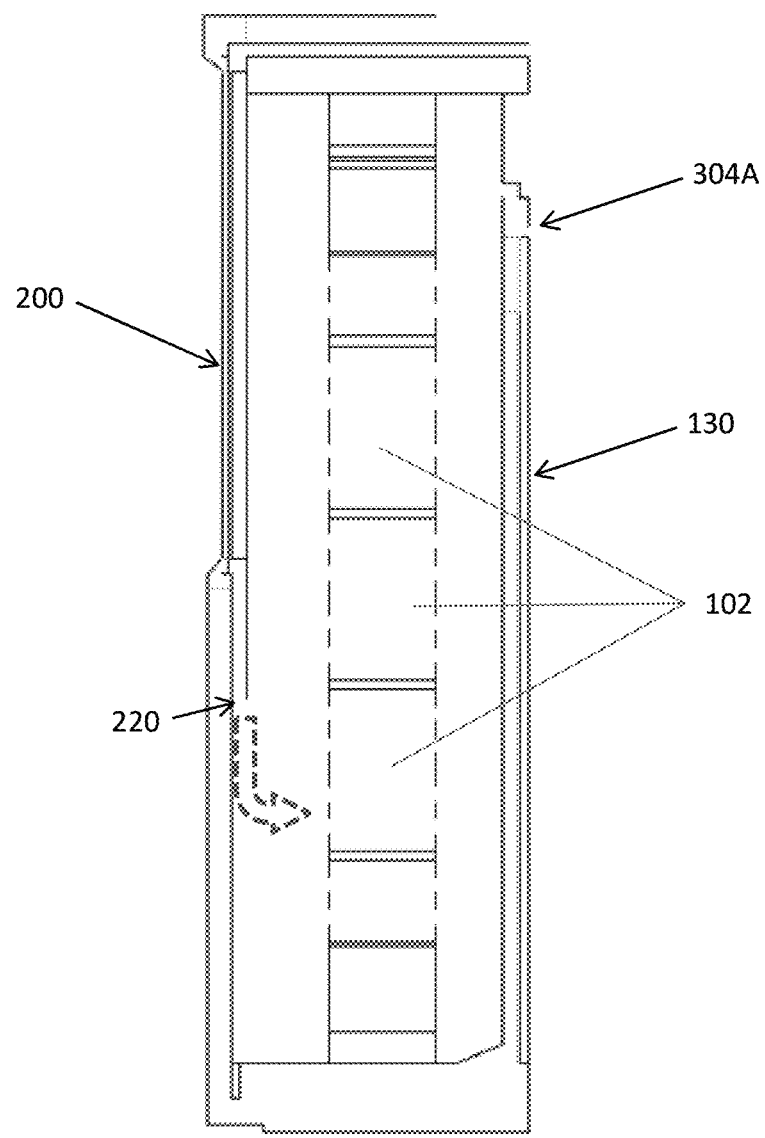

FIGS. 4A-4H are sectional views of the hotbox 100 and cathode recuperator 200 of the system of FIG. 1, according to various embodiments of the present disclosure. In particular, FIG. 4A shows an exploded three dimensional view without the heat shield insulation, and FIGS. 4B and 4C are three-dimensional views with heat shield insulation 202A, 202B installed. FIG. 4D is a top view of the cathode recuperator 200, and the FIG. 4E is a side cross sectional view of the recuperator 200. FIGS. 4F-4H illustrate air flow through the cathode recuperator 200.

Referring to FIGS. 1 and 4A-4H, the cathode recuperator 200 is a heat exchanger in which the air inlet stream exchanges heat with the air (e.g., cathode) exhaust stream from the fuel cell stack 102. Preferably, the air inlet stream is preheated in the anode cooler described above before entering the cathode recuperator 200.

The cathode recuperator 200 may include a single cylindrical corrugated heat exchange plate 204, as shown in FIGS. 4A and 4D. The heat exchange plate 204 is preferably in the shape of a hollow cylinder. However, the plate 204 may have a polygonal cross section when viewed from the top, if desired. The heat exchange plate 204 is located between inner 202A and outer 202B heat shield insulation, as shown in FIGS. 4B-4D. The heat shield insulation 202A, 202B may comprise hollow cylinders. The heat shield insulation 202A, 202B may be supported by a heat shield 214 located below the heat exchange plate 204. A bellows 215 may be located between the heat exchanger plate 204 and the heat shield 214. An outer shell 216 may be disposed on the heat shield 214.

The cathode recuperator 200 also includes a top cap or lid 206 shown in FIG. 4A and a bottom cap or lid 207 shown in FIG. 4E. As shown in FIGS. 4A, 4B, 4F and 4G, a heat shield 208 with support ribs may be disposed below the top cap 206. The steam generator 160 may be disposed on the heat shield 208 and may comprise a baffle plate 162 with support ribs 163 supporting a steam coil assembly 164 (i.e., the coiled pipe through which flowing water is heated to steam by the heat of the ATO exhaust stream flowing around the pipe). A top lid 212 with a weld ring 213 may be disposed on the baffle plate 162 to enclose the steam generator 160. The exhaust conduit 304D in the top lid 212 exhausts the ATO exhaust stream from the hot box 100.

The single cylindrical heat exchange plate 204 and top cap 206 force the air (i.e., cathode) inlet and the ATO exhaust streams to make a non-zero degree turn (e.g., 20-160 degree turn, such as a 90 degree) turn into adjoining hollow fins of the heat exchange plate 204 as shown in FIG. 4F (side cross sectional view of the assembly) and 4G (three dimensional view of the assembly). For example, the cathode or air inlet stream flows from the anode exhaust cooler 140 to the cathode recuperator 200 through conduit 302B which is located between the heat shield 208 and the top cap 206. The air inlet stream flows substantially horizontally in an outward radial direction (i.e., in to out radially) as shown by the arrows in FIGS. 4F and 4G until the stream impacts the inner surface of the upper portion of the heat exchange plate 204. The impact forces the stream to make a 90 degree turn and flow down (i.e., in an axial direction) in the inner corrugations. Likewise, the hot ATO exhaust stream shown by arrows in FIGS. 4F and 4G first flows vertically from below through conduit 304B from the ATO and is then substantially horizontally in the end portion of conduit 304B in a substantially inward radial direction to impact the outer surface of the lower portions of the heat exchange plate 204. This causes the ATO exhaust stream to make a non-zero degree turn and flow up (i.e., in an axial direction) in the outer corrugations of plate 204. This heat exchange plate 204 design allows for effective heat transfer and minimizes the thermal variation within the system (from the misdistribution of air).

Hot and cold flow streams flow in adjacent corrugations, where the metal of the corrugated heat exchange plate 204 separating the flow streams acts as a primary heat exchanger surface, as shown in FIG. 4D, which is a top cross sectional view of a portion of the heat exchange plate 204. For example, the relatively cool or cold air inlet stream flows inside of the heat exchange plate 204 (including in the inner recesses of the corrugations) and the relatively warm or hot ATO exhaust stream flows on the outside of the plate 204 (including the outer recesses of the corrugations). Alternatively, the air inlet stream may flow on the inside and the ATO exhaust stream may flow on the outside of the heat exchange plate 204.

One side (e.g., outer side) of the heat exchange plate 204 is in fluid communication with the exhaust conduit 304B, which is connected to the air exhaust of the solid oxide fuel cell stack 102 and/or the ATO 130 exhaust. The second side of the corrugated plate 204 is in fluid communication with a warm air output conduit 302B of the anode exhaust cooler 140 described above.

As shown in FIG. 4H, the air inlet stream (shown by dashed arrow) exiting the cathode recuperator 200 may be directed towards the middle lengthwise portion of a fuel cell stack 102 or column of fuel cell stacks, to provide additional cooling in the otherwise hottest zone of the stack or column. In other words, middle portion of the fuel cell stack or column is relatively hotter than the top and bottom end portions. The middle portion may be located between end portions of the fuel cell stack or column such that each end portion extends 10-25% of the length of the fuel cell stack or column and the middle portion is 50-80% of the length of the stack or column.

The location of the air inlet stream outlet 220 of the cathode recuperator 200 can be tailored to optimize the fuel cell stack or column temperature distributions. Thus, the vertical location of outlet 220 may be adjusted as desired with respect to vertically oriented stack or column. The outlet 220 may comprise a circular opening in a cylindrical recuperator 200, or the outlet 220 may comprise one or more discreet openings adjacent to each stack or column in the system.

Since the air inlet stream in FIG. 4H exiting outlet 220 is relatively cool compared to the temperature of the stack or column, the air inlet stream may provide a higher degree of cooling to the middle portion of the stack or column compared to the end portions of the stack or column to achieve a higher temperature uniformity along the length of the stack of column. For example, the outlet 220 may be located adjacent to any one or more points in the middle 80%, such as the middle 50%, such as the middle 33% of the stack or column. In other words, the outlet 210 is not located adjacent to either the top or bottom end portions each comprising 10%, such as 25% such as 16.5% of the stack or column.

Heat Exchanger Fabrication

As discussed above, heat exchangers of a fuel cell system may include a heat exchange plate, such as heat exchange plate 204, which is connected to other structural components of the fuel cell system. In particular, a fluid-tight connection should be formed between the heat exchange plate of the heat exchanger and other structural components of the system, such as top and bottom caps 206, 207 of the heat exchanger containing the heat exchange plate, for example, or other structural components of the fuel cell system located outside the heat exchanger. Due to the corrugated shape and low thickness of conventional heat exchange plates, vacuum brazing is commonly used to form such fluid-tight connections. However, vacuum brazing is a relatively expensive, low throughput process that may require specialized equipment in order to properly establish fluid-tight connections.

Figure 5A:
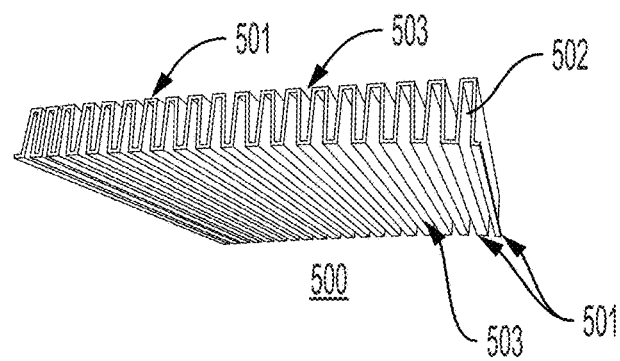
FIGS. 5A-5E are photographs showing the formation of a heat exchange plate, according to various embodiments of the present disclosure.

FIGS. 5A-5E are photographs showing the construction of a heat exchange plate 500 using a flattening process, according to various embodiments of the present disclosure. Referring to FIG. 5A, a corrugated heat exchange plate 500 may be formed using any suitable process. For example, the heat exchange plate 500 may be formed by corrugating a metal plate formed of a metal having a high heat conductivity, such as nickel and/or chromium alloys (e.g., Inconel alloy), aluminum, steel or other alloys suitable for use at the fuel cell system operating temperature. Accordingly, the heat exchange plate 500 may include corrugations 501 (e.g., fins) which at least partially define gas flow channels 503 on the back sides thereof, and opposing ends 502 of the heat exchange plate 500 may initially have a generally serpentine pattern of the corrugations 501.

Figure 5B:
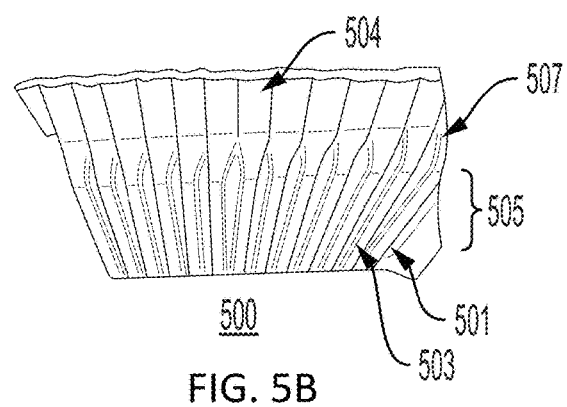

As shown in FIG. 5B, the opposing ends 502 of the heat exchange plate 500 may be flattened to form flattened ends 504. In some embodiments, the flattened ends 504 may be formed by using a hydraulic press or the like. The flattened ends 504 may increase a contact area between the heat exchange plate 500 and adjacent structural components connected thereto.

As shown in FIG. 5B, flattening the opposing ends 502 of the corrugated heat exchange plate 500 includes overlapping the corrugations 501 at the opposing ends 502 of the corrugated heat exchange plate 500 without overlapping the corrugations 501 in a middle portion 505 of the heat exchange plate 500. The middle portion 505 is located between the opposing flattened ends 504 of the heat exchange plate 500. Thus, the channels 503 are eliminated due to the flattened, overlapping corrugations 501 in the flattened ends 504 of the heat exchange plate 500. A sloped (i.e., tapered) transition region 507 is located between the flattened ends 504 and the corrugations 501 and channels 503 in the middle portion 505 of the heat exchange plate 500.

In some embodiments, the flattening process may result in the flattened ends 504 including multiple overlapping corrugations (e.g., fins) 501 of the plate 500 material. As a result, the thickness of the flattened ends 504 may be greater than the thickness of the middle portion 505 of the heat exchange plate 500 located between the flattened ends 504. Herein, the "plate thickness" may refer to the thickness of a plate used to form the heat exchange plate 500 and/or a wall thickness of the corrugations 501 in the middle portion 505. In other words, if the heat exchange plate 500 is formed from a metal plate having a thickness of X, then the thickness of the flattened ends 504 may be at least 2X, such as from about 2X to about 4X, or from about 3X to about 4X. The increased thickness of the flattened ends 504 allows for the heat exchange plate 500 to be welded to thicker materials, as compared to an end having a thickness equal to the plate thickness of heat exchange plate 500.

In some embodiments, the flattened ends 504 may have a width ranging from about 1 cm to about 6 cm, such as from about 1.5 cm to about 3.5 cm, or about 2.5 cm. Accordingly, the width of the flattened ends 504 provide sufficient contact area to easily and reliably weld the flattened ends 504 to other system structural components, as will be discussed below.

Figure 5C:
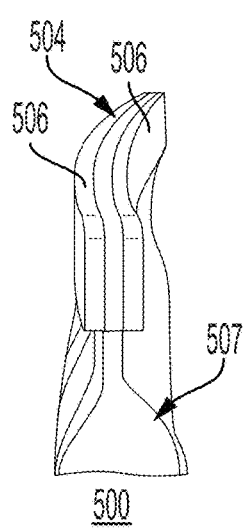
Figure 5D:
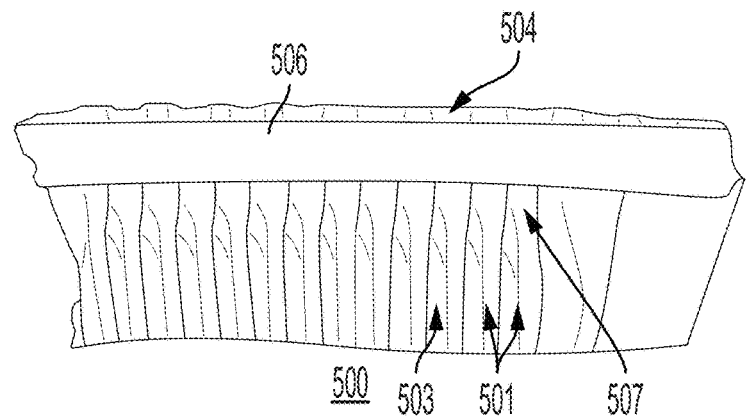
Figure 5E:
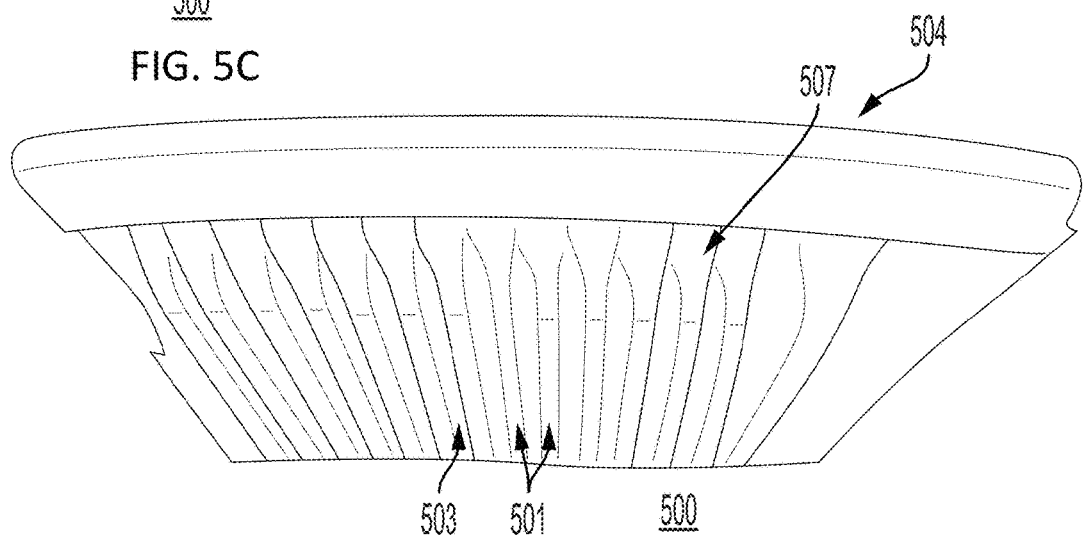

As shown in FIGS. 5C-5E, the thickness of the flattened ends 504 may be further increased by welding optional support plates 506 to opposing sides of the flattened ends 504. The support plates 506 may comprise any suitable metal or metal alloy, such as nickel and/or chromium alloys (e.g., Inconel alloy), aluminum, steel or other alloys suitable for use at the fuel cell system operating temperature. The support plates 506 may comprise the same or different material from the material of the heat exchange plate 500.

The support plates may comprise flat metal or metal alloy plates. In particular, the support plates 506 may be initially tack-welded to the flattened ends 504, as shown in FIGS. 5C and 5D, before being fully welded as shown in FIG. 5E. The welding may include any suitable welding method (that excludes brazing), such as arc welding, torch welding, or the like.

In some embodiments, one or more support plates 506 may be welded to only one side of each flattened end 504. In other embodiments, one or more support plates 506 may be welded to each side of each flattened end 504. Although not shown in FIGS. 5A-5E, the heat exchange plate 500 may have a curved and/or cylindrical configuration.

The increased thickness of the flattened ends 504 provided by the support plates 506 allows for the heat exchange plate 500 to be reliability welded to even thicker structural components, as compared to flattened ends that lack support plates. Alternatively, the support plates 506 may be omitted, and the flattened ends are welded directly to structural components of the fuel cell system. Accordingly, fluid-tight welds may be substantially easier to achieve, as compared to using a vacuum brazing process.

Figure 6:
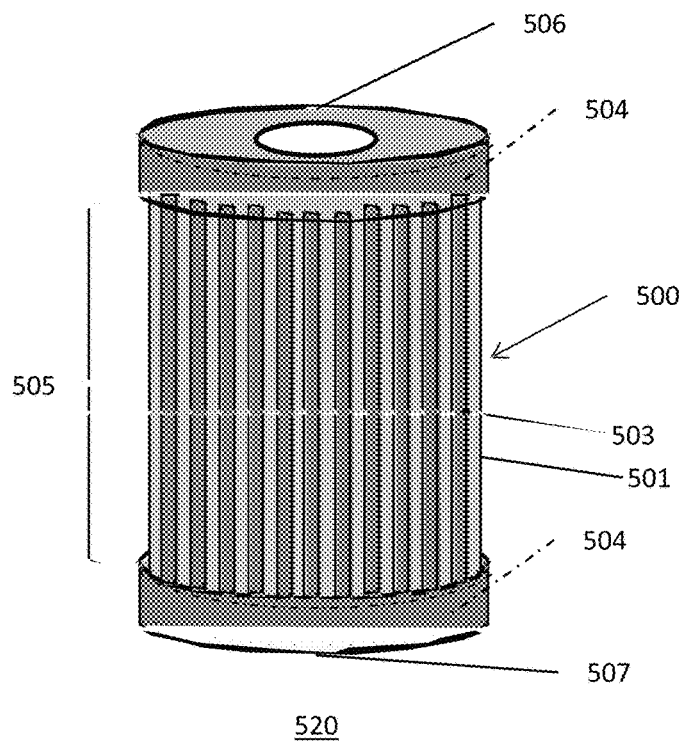
FIG. 6 is a perspective view of a heat exchanger formed using the heat exchange plate of FIGS. 5A-5E.

FIG. 6 is a perspective view of a heat exchanger 520 formed using the heat exchange plate 500. The heat exchanger 520 may comprise the cathode recuperator heat exchanger 200 described above, or any other suitable heat exchanger described above or used in a different fuel cell system. Referring to FIG. 6, the corrugated heat exchange plate 500 and may be bent into a cylindrical configuration to form a hollow cylinder. The axis of the hollow cylinder may extend parallel to the direction of the corrugations 501 and channels 503. For example, the corrugated heat exchange plate 500 may be bent and welded in a direction perpendicular to the lengths of the flattened ends 504. In some embodiments, multiple corrugated heat exchange plates 500 may be welded and/or bent to form a hollow cylinder. The bending step may follow the corrugation step shown in FIG. 5A, and the end 502 flattening step described above with respect to FIG. 5B.

The flattened ends 504 may then be welded to structural components of a fuel cell system, either directly or indirectly via the support plates 506. In other words, the flattened ends 504 may be first welded to one or support plates 506, and the support plates 506 may then be welded to the structural components of the fuel cell system. Alternatively, the support plates 506 may be omitted and the flattened ends 504 may be welded directly to the structural components of the fuel cell system.

In one embodiment, the structural components of the fuel cell system comprise respective top and bottom caps 526, 527 of a heat exchanger 520 containing the heat exchange plate 504. For example, if the heat exchanger comprises the cathode recuperator 200 described above, then the top and bottom caps 526, 527 may correspond to the respective top and bottom caps 206, 207 of the cathode recuperator heat exchanger 200. The welding may include any suitable welding method (that excludes brazing), such as arc welding, torch welding, or the like. Thus, the flattened ends 504 may be welded directly to the end caps 526, 527 of the heat exchanger 520 containing the heat exchange plate 500. In an alternative embodiment, the flattened ends 504 may be welded indirectly to the end caps 526, 527 of the heat exchanger 520 via the intervening support plates 506. In another alternative embodiment, the flattened ends 504 may be welded directly or indirectly to other structural components of the fuel cell system 10 that are not part of the same heat exchanger 520. For example, the top flattened end 504 may be welded directly to the steam generator 160 of the fuel cell system 10 if the top cap 206, 526 is omitted.

Accordingly, the flattened ends 504 provide a larger contact surface between the heat exchange plate 500 and a connected structural component, such as a component of a fuel cell system. In addition, the thickness of the flattened ends 504 allows for the reliable formation of fluid-tight welded joints. In addition, manufacturing capacity and throughput may be increased, since a vacuum brazing furnace is not required to connect the heat exchange plate 500 to adjacent system components. Further, the heat exchange plate 500 may allow for forming welded joints that are more robust than brazed joints, and that allow for reworking of a final heat exchange device.

In one embodiment, the heat exchanger 520 comprises a corrugated, cylindrical heat exchange plate 500 having opposing first and second flattened ends 504 separated by a middle portion 505 containing unflattened corrugations 501 containing gas flow channels 503, a top cap 526 welded to the first flattened end 504, and a bottom cap 507 welded to the second flattened end 504.

In one embodiment, the top and bottom caps 526, 527 are welded directly to the respective flattened ends 504 of the heat exchange plate 500. In another embodiment, the top and bottom caps 526, 527 are welded indirectly to the flattened ends 504 of the heat exchange plate 500 via the support plates 506.

In one embodiment, the first and second flattened ends 504 comprise overlapping corrugations 501 and no gas flow channels 503. Tapered transition portions 507 are located between the middle portion 505 and each respective first and second flattened end 504. A thickness of the flattened ends 504 is greater than a thickness of the middle portion 505 of the heat exchange plate 500.

In one embodiment, the heat exchanger 200, 520 is placed into a fuel cell system 10. The fuel cell system 10 comprises the heat exchanger 200, 520, at least one fuel cell stack 102, an anode tail oxidizer (ATO) 130 fluidly connected to the fuel cell stack 102 and to the heat exchanger 200, 500, and an air conduit 302B fluidly connected to the heat exchanger 200, 520. The heat exchange plate 500 is configured to separate a stack air inlet stream (provided to the heat exchanger 200, 520 from the air conduit 302B), from an ATO exhaust stream provided to the heat exchanger 200, 520 from the ATO 130 via conduit 304B.

Figure 7A:
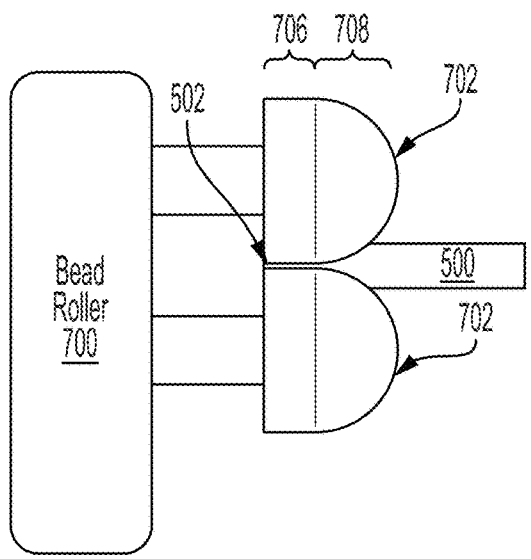
FIGS. 7A and 7B are perspective views showing an alternative method of forming flattened ends of a heat exchange plate, according to various embodiments of the present disclosure.
Figure 7B:
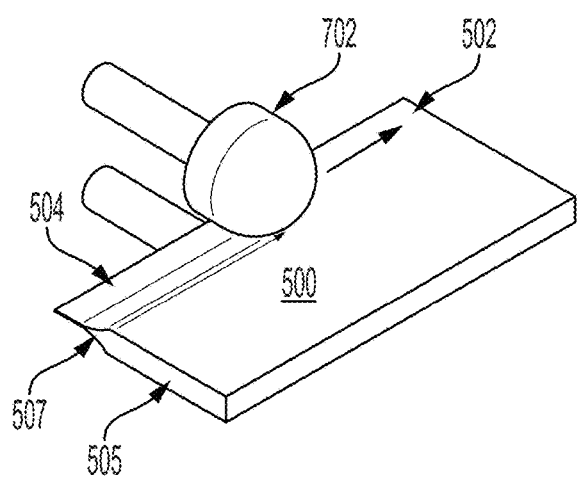

FIGS. 7A and 7B illustrate an alternative method of forming the flattened ends 504 of the heat exchange plate 500, according to various embodiments of the present disclosure. Referring to FIGS. 5A, 5B, 7A, and 7B, the present inventors discovered that using a hydraulic press to form the flattened ends 504 of the heat exchange plate 500 may result in the application of excessive amounts of stress to transition regions 507 of the heat exchange plate 500. For example, the pressing may strain the transition regions 507, which may result in damage and/or a reduction in strength to the transition regions 507.

In order to better distribute the forces applied during the formation of the flattened ends 504, the flattened ends 504 may be formed using a bead roller 700. In particular, the bead roller 700 may include opposing dies 702 configured roll along an end 502 of the heat exchange plate 500 and apply pressure to opposing sides thereof to form the flattened ends 504.

In particular, the dies 702 may each comprise a cylindrical portion 706 and a hemispherical portion 708. The cylindrical portions 706 may be spaced apart by a distance equivalent to an intended thickness of the flattened ends 504. An axial length of the cylindrical portions 706 may be equal to the width of a flattened end 504 formed thereby. The outer surface of the hemispherical portions 708 may have a radius of curvature configured to form a corresponding curvature in the transition regions 507, and thereby reduce the strain and/or stress applied to the transition regions 507.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A method of forming a fuel cell system heat exchanger, comprising:
    flattening opposing ends of a corrugated heat exchange plate using a bead roller to form opposing flattened ends; and
    welding the flattened ends to structural components of the fuel cell system,
    wherein the flattening the opposing ends comprises overlapping corrugations at opposing ends of the corrugated heat exchange plate without overlapping the corrugations in a middle portion of the heat exchange plate located between the opposing flattened ends of the heat exchange plate; and
    wherein the bead roller comprises opposing roller dies, the roller dies comprising cylindrical portions which form the flattened ends, and hemispherical portions which form a tapered transition region between the flattened ends and channels in the corrugations in the middle portion of the heat exchange plate.

2. The method of claim 1, wherein a thickness of the flattened ends is greater than a thickness of the middle portion of the heat exchange plate.

3. The method of claim 2, wherein the thickness of the flattened ends ranges from about two times to about four times of the thickness of the middle portion of the heat exchange plate.

4. The method of claim 1, further comprising welding support plates to the flattened ends followed by welding the support plates to the structural components, such that the flattened ends are indirectly welded to the structural components.

5. The method of claim 4, wherein welding the support plates comprises welding support plates to opposing sides of each flattened end.

6. The method of claim 1, wherein welding the flattened ends to structural components comprises directly welding the flattened ends to the structural components of the heat exchanger.

7. The method of claim 6, wherein the heat exchanger comprises a cathode recuperator and the structural components comprise end caps of the cathode recuperator.

8. The method of claim 1, wherein the flattened ends have a width ranging from about 1 cm to about 6 cm.

9. The method of claim 1, further comprising welding opposing sides of the heat exchange plate to each other such that the heat exchange plate has a cylindrical shape, before welding the flattened ends to the structural components.

10. The method of claim 1, further comprising placing the heat exchanger into the fuel cell system which contains at least one fuel cell stack.

* * * * *